June 12, 1951

G. K. TEAL

METHOD OF PRODUCING RECTIFIERS AND RECTIFIER MATERIAL

Filed Oct. 29, 1947

2,556,711

INVENTOR
G. K. TEAL
BY R. J. Guenther
ATTORNEY

Patented June 12, 1951 2,556,711

UNITED STATES PATENT OFFICE 2,556,711

METHOD OF PRODUCING RECTIFIERS AND RECTIFIER MATERIAL

Gordon K. Teal, Summit, N. J., assignor to Bell Telephone Laboratories, Incorporated, New York, N. Y., a corporation of New York Application October 29, 1947, Serial No. 782,729

4 Claims. (Cl. 175—366)

This invention relates to methods of producing germanium alloys especially suitable for use in electrical devices and more particularly to methods of producing germanium rectifier elements.

Germanium bodies containing a trace, for example hundredths or thousandths of one per cent, of certain impurities exhibit electrical characteristics which render them especially suitable for use as rectifiers. The particular nature of these characteristics is dependent upon the impurity and the amount thereof. For example, germanium having a trace of either antimony or arsenic therein is electrically asymmetric, the current flow being greatest when the germanium element is negative with respect to an electrode associated therewith. On the other hand, alloys of germanium and boron, the latter being present as a trace, also are asymmetric electrically but the current flow therethrough is greatest when the germanium element is positive relative to an electrode associated therewith. The rectifier characteristics, such as rectification ratio and back voltage, for an alloy including any particular impurity, are determined by the amount of the impurity present in the germanium body.

One object of this invention is to expedite the production of germanium alloys especially suitable for use in electrical devices.

Another object of this invention is to facilitate the attainment of a prescribed impurity content in germanium rectifier materials.

A further object of this invention is to simplify processes of producing germanium alloys having prescribed electrical characteristics.

Still another object of this invention is to reduce the manufacturing cost of germanium rectifier material.

In accordance with one feature of this invention, bodies of germanium having a desired impurity therein are formed by the pyrolytic decomposition of compounds, e. g. halides or hydrides, in the gaseous state, of germanium and the impurity, the two elements, i. e. the germanium and impurity, being deposited simultaneously upon a base member.

In one specific embodiment of this invention, a germanium-antimony rectifier body is produced by introducing a gaseous mixture of germanium chloride, hydrogen and antimony chloride into a reaction chamber having a base member therein, the chamber being heated to effect deposition of germanium and antimony upon the base member from the chlorides.

Figure 1:
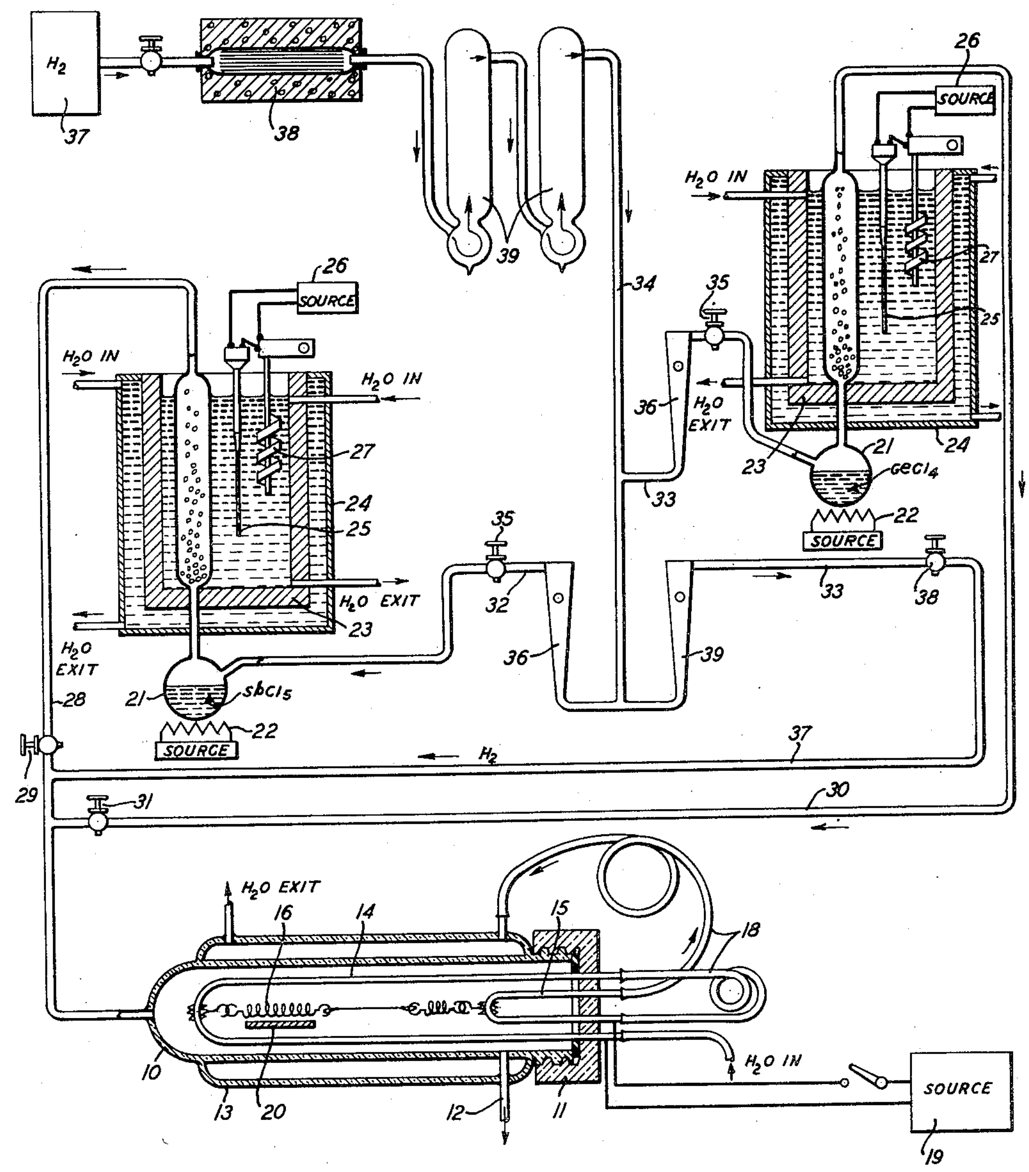
Figure 2:
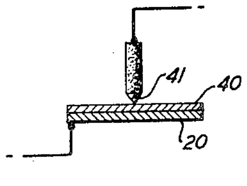

The invention and the above-noted and other features thereof will be understood more clearly and fully from the following detailed description with reference to the accompanying drawing in which:

Fig. 1 is a diagram illustrating apparatus which may be employed in the production of germanium alloys in accordance with this invention; and Fig. 2 is an enlarged sectional view showing the principal components of a rectifier including germanium rectifier material produced in accordance with this invention.

Referring now to the drawing, the apparatus illustrated in Fig. 1 comprises a vitreous vessel 10 having a removable base 11 and defining a reaction chamber, the vessel being provided with an exhaust tubulature 12 and also with a jacket 13 defining therewith a chamber through which a cooling fluid may be circulated. Supported from the base 11 are a pair of U-shaped members 14 and 15 of metal, e. g. copper, tubing between which a heater filament 16, for example of tantalum, is suspended. The members 14 and 15 are coupled to one another, to the jacket 13 and to a source of cooling fluid, not shown, by insulating, e. g. rubber, tubing or hoses 18.

A suitable source 19 is connected to the members 14 and 15 for passing a heating current through the filament 16. A base member 20, which may be of tantalum, is mounted within the reaction chamber by supports (not shown) and in immediate proximity to the filament 16 so as to be heated thereby.

The germanium and impurity compounds to be pyrolytically decomposed in the reaction chamber are produced in two similar boilers each of which comprises a flask or retort 21 having a heater 22 associated therewith and disposed in a water bath 23 having a water cooling jacket 24 thereon. The water bath is maintainable at a prescribed temperature by a heater 25 energized from a source 26 through a thermostatic regulator 27.

One of the retorts has therein a quantity of an antimony compound, such as antimony pentachloride ($SbCl_5$) as indicated in Fig. 1; the other retort has therein a quantity of a germanium compound, such as germanium tetrachloride ($GeCl_4$), as also indicated in Fig. 1. The antimony boiler is connected to the reaction chamber by way of a pipe or conduit 28 having a valve 29 therein; the germanium boiler is connected similarly to the reaction chamber by way of a pipe or conduit 30 having a valve 31 therein.

Purified and dried hydrogen is supplied to both the boilers by way of lines 32 and 33 leading from a main pipe 34, each line including therein a valve 35 and a flowmeter 36. The hydrogen is obtained from a source or tank 37 from whence it passes through a deoxidizing furnace 38 and drying tubes 39 to the pipe 34. The furnace results in complete removal of any oxygen that may be mixed with the hydrogen in the tank, and the drying tubes 39, which may have phosphorous pentoxide ($P_2O_5$) therein, remove any water vapor from the hydrogen that is passed thereto.

A by-pass line 37 including a valve 38 and flowmeter 39 may be provided to permit hydrogen dilution of the gases supplied to the reaction chamber.

A suitable tank, not shown, may be coupled to the reaction chamber to flush it, as with pure nitrogen, whenever desired.

In the production of germanium-antimony alloys, the germanium tetrachloride is heated to vaporize it, the conditions at the germanium boiler being made such that the hydrogen passed to the condenser is saturated or slightly supersaturated with germanium chloride, thus insuring a saturated gas being supplied through pipe 30. Similarly, the antimony pentachloride is heated to vaporize it, the conditions at the antimony boiler being made such that the hydrogen passed to the condenser is saturated or slightly supersaturated with antimony chloride, thus insuring a saturated gas being supplied through pipe 28. The two hydrogen-chloride mixtures are introduced into the reaction chamber in relative amounts controlled by the valves 35. In the reaction chamber, the chlorides are pyrolytically decomposed by virtue of the heat due to the filament, and germanium and antimony are deposited simultaneously upon the base member 20 to form a germanium-antimony alloy film or coating thereon.

The relative proportions of germanium and antimony in the film or coating can be controlled accurately by adjustment of the valves 35 and control of the temperatures in the flasks of the boilers. Where germanium tetrachloride and antimony pentachloride are used, the condenser in the germanium boiler may be maintained at 12° C., the flask being at a substantially higher temperature, for example at 25° C. or any other up to the boiling point, the condenser in the antimony boiler may be maintained at about 0° C., and the flask in this boiler may be maintained at about 25° C. or other temperature up to the boiling point. To produce alloys wherein the antimony constitutes of the order of .001% of the total by weight, the valves 35 may be adjusted so that the flow of hydrogen to the germanium and antimony boilers is in the ratio of about 100 to 1. The valve 38 in the hydrogen by-pass line 37 may be set to produce a 200% hydrogen dilution of the mixture supplied to the reaction chamber.

Although in the specific example above described, antimony is the impurity and antimony pentachloride is the compound from which the antimony is obtained, other impurities and compounds may be employed. For example, if the impurity desired is antimony, antimony trichloride ($SbCl_3$) may be used. In the case of arsenic as the impurity, either the trichloride or pentachloride may be used. Where boron is the desired impurity, it may be obtained from the trichloride. Also, other halides of antimony, arsenic and boron may be used in connection with germanium tetrachloride. Furthermore, other compounds of germanium, such as a germanium hydride ($GeH_4$) may be employed. Hydrides of aresnic, antimony and boron also may be used.

Also, although in the specific embodiment illustrated a single germanium alloy-base member unit is produced, it will be appreciated that a plurality of such units may be formed simultaneously. Further, although a filament has been shown to produce the requisite temperature in the reaction chamber, an external heat source may be employed.

The germanium alloy-base member unit, when removed from the reaction chamber, may be used in a rectifier as illustrated in Fig. 2, wherein the alloy is designated as 40. The exposed face thereof may be etched in ways known in the art and a point contact 41, for example of tungsten, pressed thereagainst to form a rectifying junction. If the impurity in the alloy is either antimony or arsenic, the rectifier will be of the *n* type; if it is boron, the rectifier will be of the *p* type.

It will be appreciated that the method of producing germanium rectifier material described hereinabove is characterized by simplicity and by facility of control of the amount of impurity in the product. It will be noted further that this method obviates the cutting and heat treating steps entailed in prior methods of producing germanium rectifier material and, thus, expedites the manufacture and reduces the manufacturing cost of germanium rectifier material.

Although specific embodiments of the invention have been shown and described, it will be understood that they are but illustrative and that various modifications may be made therein without departing from the scope and spirit of this invention as defined in the appended claims.

What is claimed is:

1. The method of producing rectifier material comprising germanium having therein a trace of an impurity selected from the group consisting of antimony and arsenic, which comprises mounting a base member in a chamber, introducing germanium chloride and a chloride of said impurity, both in the gaseous state, into said chamber, introducing hydrogen into said chamber, and heating said chamber to effect concurrent decomposition of both the chlorides thereby to deposit germanium and the impurity simultaneously upon said base member.

2. The method of producing rectifier material comprising germanium having a fraction of one per cent of antimony therein, which comprises mounting a base member within a chamber, producing a first gaseous mixture of hydrogen substantially saturated with germanium chloride, producing a second gaseous mixture of hydrogen substantially saturated with antimony pentachloride, introducing both the mixtures into said chamber, and heating said chamber to deposit germanium and antimony upon said member.

3. The method of making a rectifier which comprises depositing a body consisting essentially of germanium having therein a trace of an impurity selected from the group consisting of antimony and arsenic, by pyrolytic decomposition of gaseous compounds of germanium and the impurity, and making a rectifying contact to said body.

4. The method of making a rectifier which comprises depositing upon a metallic base, by simultaneous pyrolytic decomposition of gaseous halides of the constituent elements thereof, a coating of germanium containing a trace of an impurity selected from the group consisting of antimony and arsenic, etching the surface of said coating remote from said base, and applying a point contact to said surface.

GORDON K. TEAL.

REFERENCES CITED

The following references are of record in the file of this patent:

UNITED STATES PATENTS

| Number | Name | Date |
|---|---|---|
| 1,149,701 | Thowless | Aug. 10, 1915 |
| 1,739,256 | Pender | Dec. 10, 1929 |
| 2,313,410 | Walther | Mar. 9, 1943 |